Patented Feb. 3, 1925.

1,525,328

UNITED STATES PATENT OFFICE.

JAMES E. SHEAFFER, OF BURNHAM, PENNSYLVANIA.

REFRACTORY MATERIAL.

No Drawing.  Application filed July 5, 1922. Serial No. 572,978.

*To all whom it may concern:*

Be it known that I, JAMES E. SHEAFFER, residing at Burnham, in the county of Mifflin and State of Pennsylvania, a citizen of the United States, have invented or discovered certain new and useful Improvements in Refractory Materials, of which improvements the following is a specification.

My invention relates to improvements in refractory material adapted for use in the lining of furnaces within which great heat is generated. It may be applied in bulk, and while still in plastic condition, to the proper supporting surface and spread upon that surface to constitute the furnace lining, or it may and preferably will be formed into bricks, from which bricks the furnace lining will be built. It is a material which, being prepared in the manner hereinafter described, may be and will be applied without preparatory burning, that is to say, it is an unburned lining material. Its characteristic features are first, the feature or characteristic already indicated, that no curing of the material is required, but as soon as it has been compounded (and shaped into bricks, if such shaping be desired), may be applied directly in the forming of the furnace lining. The second feature is that, under the intense heat of furnace use, it is in highest degree refractory. Through all the range of temperature of an open-hearth furnace used in steel making, there will be no melting nor running away, but at most a mere superfical fusing and glazing. A further feature is that the material when in use will not spall. By virtue of these characteristics a furnace lining built of my material is durable in high degree.

Furnace lining in which my invention consists is in practice compounded in the following manner:

Dead burned magnesite of the following varieties,—Austrian, Grecian, American, and Canadian are mingled together in such proportions that the mixture corresponds to the following analysis:

Silica, 3.50% to 6.50%; iron oxide, 2.50% to 3.50%; alumina, 2.00% to 3.00%; calcium oxide, .25% to 4.00%; magnesia, 85.00% to 90.00%.

In specifying, as I have above, magnesite of certain named varieties, I am meaning merely to give an exemplary mix, and I do not mean to exclude from the scope of my invention the possibility of using magnesite of other varieties. For example, there is found in California a magnesite whose magnesia content amounts to as much as 92 per cent. This being properly blended with magnesite of other varieties, is available to one who practices my invention, and is considered to be a highly desirable variety to use.

The magnesite, compounded as has now been explained, is pulverized in suitable manner to such degree that from 35% to 50% of it will pass through a 100-mesh screen. This of course is indicative of the degree of fineness to which pulverizing should go, and indicates with what care and precision the preparation should be conducted, in order to get the best results, but it is not a limitation upon the invention. One who practices the invention will understand that the essential thing is a minute pulverization.

When the magnesite has been ground, it is mixed with a binder. The binder which I use in a substance known as lignin liquor; it is a by-product of paper manufacture, and carries material derived from the sap of spruce trees. It is an aqueous liquid, somewhat heavier than water, which as it dries leaves a sticky residue. At 60° F. it has a specific gravity of 1.261. Its total solid constituent amounts to 50.6%, and of this 44% is organic and 6.6% mineral. The organic matter is made up of the noncellulose components of wood; the mineral matter is chiefly calcium oxide. Additionally, sulphur is present, to the amount of 2.3%.

The mixing of the magnesite with the binder may be conducted in an open wet hand grinder of the heavy Muller type. The binder is added in sufficient quantity to produce with the magnesite a plastic substance. The mixing should be carefully conducted and thoroughly accomplished, so that the plastic material shall be homogeneous throughout.

When the mixing process has been carried out carefully and properly, the material may, as has been said, be applied in bulk to form the furnace lining, but ordinarily it will be placed in molds and pressed into bricks. The drying begins very soon after the binder has been added to and mixed with the magnesite, and accordingly the operation of pressing into bricks must be carried on rapidly.

The pressure on the material when molding should be about from 60 to 75 tons on the brick. Too little pressure will not give in the finished article the required strength, and too much pressure will break the bond.

In the course of the specification I have mentioned the open-hearth steel furnace as a furnace for the lining of which my material is suitable. It will of course be understood that what I say here is merely by way of example, and the material is applicable for a lining material for electrical furnaces as well and, generally, where high temperatures are to be withstood.

I wish further to say respecting the formula which I have given above that it is a formula which is based upon practical experience. As a matter of fact it is theoretically desirable to reduce the silica, the iron oxide, the alumina and the calcium oxide ingredients to the lowest practicable point, and at the same time to see to it that the magnesia content shall not be less than 85%. Accordingly it is the maximum limit given with respect to the first four substances, and the minimum limit given with respect to the last which are controlling. But in giving maximum and minimum limits to all of the substances, I define, as I have just said, the range which I have found to exist in practice.

I claim as my invention:

1. A material for furnace lining conforming to the following formula: silica up to 6.5%; iron oxide up to 3.5%; alumina up to 3%; calcium oxide up to 4%; magnesia not less than 85%; pulverized and mixed with lignin liquor, substantially as described.

2. An unburned refractory brick composed of the following ingredient substances: silica up to 6.5%; iron oxide up to 3.5%; alumina up to 3%; calcium oxide up to 4%; magnesia not less than 85%—united with lignin liquor, substantially as described.

3. A refractory made from powdered calcined magnesite and lignin liquor.

In testimony whereof I have hereunto set my hand.

JAMES E. SHEAFFER.

Witnesses:
BAYARD H. CHRISTY,
PERCY A. ENGLISH.